(12) United States Patent
Walker et al.

(10) Patent No.: US 7,897,006 B2
(45) Date of Patent: Mar. 1, 2011

(54) METHOD OF ADHERING A MATERIAL TO ANOTHER MATERIAL AND PRODUCT PRODUCED BY THE METHOD

(76) Inventors: Valerie Walker, Schomberg (CA); Pat Cain, Mississauga (CA)

( * ) Notice: Subject to any disclaimer, the term of this patent is extended or adjusted under 35 U.S.C. 154(b) by 121 days.

(21) Appl. No.: 10/669,345

(22) Filed: Sep. 25, 2003

(65) Prior Publication Data

US 2004/0182495 A1 Sep. 23, 2004

(30) Foreign Application Priority Data

Sep. 26, 2002 (CA) .................................. 2405368

(51) Int. Cl.
*C09J 5/04* (2006.01)
(52) U.S. Cl. ........................................ 156/314; 156/315
(58) Field of Classification Search .................. 156/295, 156/291, 315, 316, 290; 445/25; 29/846, 29/843, 844, 847
See application file for complete search history.

(56) References Cited

U.S. PATENT DOCUMENTS

| | | | | |
|---|---|---|---|---|
| 4,440,821 A | * | 4/1984 | Komura et al. | 428/195.1 |
| 4,861,387 A | * | 8/1989 | Matsumoto | 136/256 |
| 5,589,246 A | * | 12/1996 | Calhoun et al. | 428/120 |
| 5,660,645 A | * | 8/1997 | Mori et al. | 136/251 |
| 5,747,101 A | * | 5/1998 | Booth et al. | 438/460 |
| 5,865,934 A | * | 2/1999 | Yamamoto et al. | 156/295 |
| 5,973,258 A | * | 10/1999 | Shiotsuka et al. | 136/252 |
| 6,187,432 B1 | * | 2/2001 | Krish et al. | 428/343 |
| 6,461,467 B2 | * | 10/2002 | Blatchford et al. | 156/230 |
| 6,909,180 B2 | * | 6/2005 | Ono et al. | 257/734 |
| 2003/0183332 A1 | * | 10/2003 | Simila | 156/291 |

* cited by examiner

*Primary Examiner* — Richard Crispino
*Assistant Examiner* — Christopher Schatz
(74) *Attorney, Agent, or Firm* — Mark B. Eisen; Dimock Stratton LLP

(57) ABSTRACT

A method of adhering a first material to a second material, which utilizes an anchoring adhesive applied to one or both of the materials as a plurality of isolated adhesive anchors having interstitial spaces between them, forming improved bonding sites for a bonding adhesive which is used to adhere the materials together. In the preferred embodiment the anchoring adhesive may be applied by a process similar to silk screening, whereby a mask or screen defines a plurality of adhesive-impervious portions which create the interstitial spaces and adhesive-pervious portions which allow adhesive to pass through the screen to create the adhesive anchors. The bonding adhesive is applied to the material over the cured adhesive anchors, which serve as high-adhesion bonding sites for the bonding adhesive. The application of anchors on one or both substrate surfaces provides for a compatible interface for the adhesive so as to preserve the inherent rigidity or flexibility of the substrates while maximizing adhesion between the materials.

11 Claims, 1 Drawing Sheet

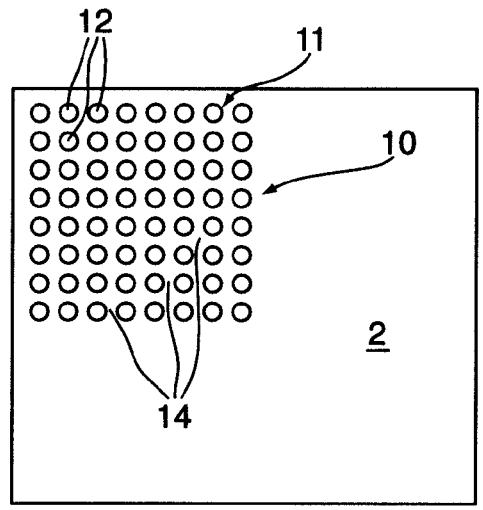
Fig. 1
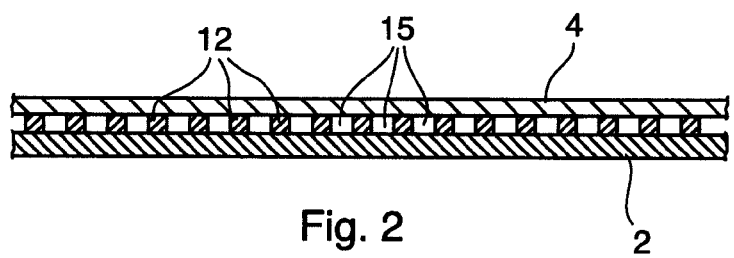
Fig. 2
Fig. 3
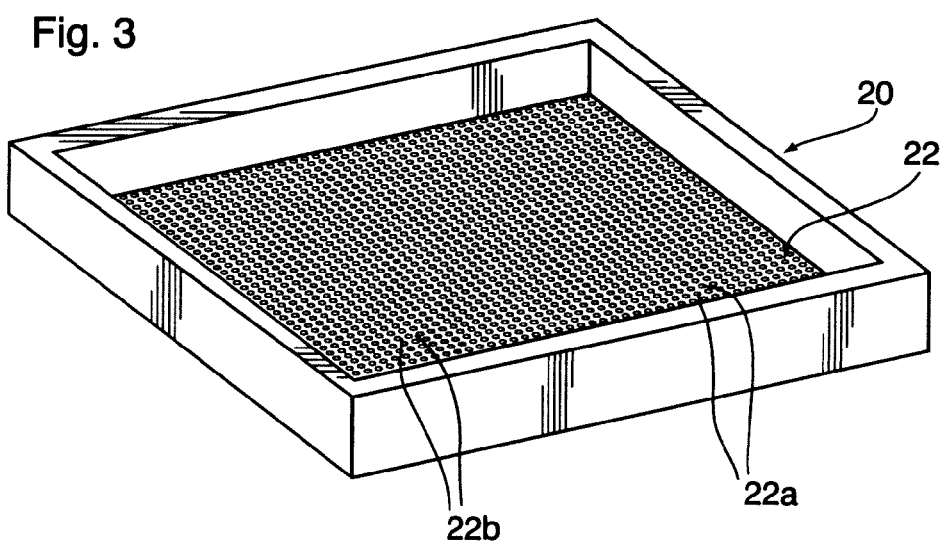

METHOD OF ADHERING A MATERIAL TO ANOTHER MATERIAL AND PRODUCT PRODUCED BY THE METHOD

FIELD OF THE INVENTION

This invention relates to adhesives. In particular, this invention relates to a method of adhering one material to another material where one or both of the materials provides a poor adhesive interface in relation to an adhesive of choice, and a product produced by the method.

BACKGROUND OF THE INVENTION

Many industrial products and processes involve adhering materials together. For example, in rollers used in printers, photocopiers and the like, a material such as rubber or urethane is adhered to a steel mandrel, which has a very poor adhesive interface. In another example, one side of a hook and loop type fastener (commonly known under by trademark VELCRO) may be adhered to a flexible or rigid material or substrate. These are merely examples; the applications for such adhesion processes are virtually infinite.

In some cases a particular adhesive will adhere effectively to a first material but poorly to a second material, while a different adhesive will adhere effectively to the second material but poorly to the first material. Selecting the best adhesive to bond the materials in such a case can be difficult, and conventionally requires a compromise on the part of the manufacturer, since the strength of the bond between the materials will be limited to the lower of the two adhesion strengths.

In other cases it may be desirable or essential to maintain the flexibility of the finished product where a flexible material is adhered to another material, but the most suitable adhesive is rigid. The desirability of retaining flexibility in the finished product may require the use of a flexible adhesive that does not adhere well to one or both of the materials, which can result in composite products of poor quality and/or low durability. Epoxies and other rigid types of adhesives often have a higher adhesion strength and can be used to adhere the flexible material to the substrate; however, while such adhesives provide a stronger bond between the materials, they reduce or substantially eliminate the flexibility of the flexible material and are therefore not suitable for applications in which flexibility is a necessary or desirable feature of the finished product.

It would accordingly be advantageous to be able to utilize any adhesive of choice in processes and products in which two materials are bonded together by an adhesive, regardless of the nature or quality of the adhesive interface provided by the materials. It would be further advantageous to be able to select a flexible adhesive for use in bonding applications which require flexibility of the finished product, while providing a higher degree of adhesion more often characteristic of rigid adhesives.

SUMMARY OF THE INVENTION

The present invention overcomes these disadvantages by providing a method of adhering a first material to a second material using an adhesive of choice as a bonding adhesive, despite a characteristically poor adhesion between the adhesive of choice and one or both of the materials.

The invention accomplishes this by using an anchoring adhesive, selected for its ability to adhere to a material that provides a poor adhesive interface for the bonding adhesive of choice. The anchoring adhesive is applied in a discontinuous fashion to create a plurality of substantially isolated adhesive anchors distributed over an adhesion zone. The adhesive anchors improve bonding by adding physical and chemical bonding sites to the adhesion zone, allowing the adhesive of choice to be used as a bonding adhesive to bond the materials without sacrificing the quality or durability of the finished product.

In the preferred embodiment the anchoring adhesive maybe applied to a substrate material by a process similar to silk screening, whereby a mask or screen having adhesive-pervious and adhesive-impervious portions is laid over the material and the anchoring adhesive is applied through the screen. Preferably the screen produces a grid-like pattern of interstitial spaces about the adhesive anchors. After the anchoring adhesive has cured, a layer of the bonding adhesive is applied to one or both materials. The bonding adhesive intrudes into the interstitial spaces between adhesive anchors and adheres to the anchoring sites formed by the adhesive anchors, to thereby bond to the material in the adhesion zone with a degree of adhesion greater than the adhesion of the bonding adhesive directly to the substrate, and potentially comparable to the strength of adhesion of the anchoring adhesive to the substrate.

In the case where flexibility is desired in the finished product but the flexible adhesive of choice adheres poorly to one or both of the materials, a higher-adhesion rigid adhesive can be used as the anchoring adhesive. When the flexible adhesive is applied as a bonding adhesive to bond the materials together, the finished product remains flexible along the interstitial spaces between adhesive anchors. The size and spacing between adhesive anchors can be selected to be sufficiently small as to approximate the adhesion of a continuous layer of anchoring adhesive, without significantly impeding the flexibility of the material even though the anchoring adhesive itself becomes rigid when cured. The adhesive anchors formed by the cured anchoring adhesive provide the flexible bonding adhesive with high-adhesion anchoring sites, and thus provide a degree of adhesion substantially equivalent to a uniform coating of the rigid anchoring adhesive but without significantly detracting from the flexibility of the finished product.

The invention accordingly facilitates the bonding of one material to another material using any adhesive of choice as a bonding adhesive, even where the adhesive of choice adheres poorly to one or both of the materials. The invention further facilitates the bonding of one material to another material using a rigid adhesive to form a high-adhesion base for a flexible bonding adhesive, where flexibility of the finished product is desired to be retained, without rigidifying the product in the area of the adhesion zone. The anchoring adhesive forms a superior interface for the bonding adhesive, by providing improved chemical and physical bonding sites for the bonding adhesive.

The invention provides a number of advantages, including facilitating the conjunction of dissimilar meeting planes; providing increased options for a bonding adhesive to be chosen which best meets the demands of a particular application; and in the case where flexibility is desired in the finished product, allowing a rigid adhesive with superior bonding properties to be used as a base for a flexible bonding adhesive, to increase the bonding strength while retaining the flexibility of the finished product. The application of anchors on one or both substrate surfaces provides for a compatible interface for the adhesive so as to preserve the inherent rigidity or flexibility of the substrates while maximizing adhesion between the materials.

The present invention thus provides a method of adhering a first material to a second material, comprising the steps of:
a. positioning the first material on a work surface, with an adhesion zone exposed; b. applying an anchoring adhesive to the first material or to the second material or to both, to form a plurality of substantially isolated adhesive anchors separated by interstitial spaces; c. after the anchoring adhesive has cured, applying a bonding adhesive to the first material or to the second material, or to both; and d. adhering the first and second materials together; whereby the anchoring adhesive has a relatively higher degree of adhesion to the first material or to the second material or to both than the bonding adhesive, and the bonding adhesive intrudes into the interstitial spaces and bonds to the adhesive anchors.

In a further aspect of the invention, the step of applying an anchoring adhesive to the first or second materials comprises the sub-steps of i. positioning a screen having a plurality of adhesive-impervious portions and adhesive-pervious portions in contact with at least the adhesion zone; ii. applying the anchoring adhesive through the adhesive-pervious portions of the screen; and iii. removing the screen.

The invention further provides a method of adhering a casting adhesive to a material, comprising the steps of: a. positioning the material on a work surface, with an adhesion zone exposed; b. applying an anchoring adhesive to the material, to form a plurality of substantially isolated adhesive anchors separated by interstitial spaces; and c. after the anchoring adhesive has gelled or cured, applying a casting adhesive to the material; whereby the anchoring adhesive has a relatively higher degree of adhesion to the material than the casting adhesive, and the casting adhesive intrudes into the interstitial spaces and bonds to the adhesive anchors.

In a further aspect of the invention, the step of applying an anchoring adhesive to the material comprises the sub-steps of i. positioning a screen having a plurality of adhesive-impervious portions and adhesive-pervious portions in contact with at least the adhesion zone; ii. applying the anchoring adhesive through the adhesive-pervious portions of the screen; and iii. removing the screen.

The invention further provides a product produced according to the methods.

BRIEF DESCRIPTION OF THE DRAWINGS

In drawings which illustrate by way of example only a preferred embodiment of the invention, FIG. 1 is a schematic plan view of a material to which an anchoring adhesive has been applied in accordance with the method of the invention, FIG. 2 is a cross sectional view of a first and/or second material bonded to a second material according to the method of the invention; and FIG. 3 is a perspective view of a silk screening apparatus used to perform the method of the invention.

DETAILED DESCRIPTION OF THE INVENTION

FIGS. 1 and 2 illustrate an application of the method of the invention for bonding a first material 2 to a second material (or casting resin system) 4 using an anchoring adhesive 11 and a bonding adhesive 15. The material 4 may be any other material, or the same as the material 2, and both materials 2, 4 may be rigid or flexible or any combination thereof. The anchoring adhesive 11 may be rigid or flexible when cured, and is preferably selected for its ability to bond to the material 2 or 4.

In the illustrated embodiment the adhesion zone 10 covers an upper-left hand portion the surface of the material 2. It will be appreciated that the adhesion zone 10 may cover all or any desired portion of the material 2 and/or the material 4. The material 2 and/or 4 to which the anchoring adhesive is applied is sometimes referred to herein as the substrate, however it will be appreciated that either the first material 2 or the second material 4, or both, may be a substrate. In practice the method of the invention works equally well regardless whether the anchoring adhesive is applied to the material 2 or 4, or both, as substrate.

Where the bonding adhesive 15 adheres poorly to both materials 2 and 4, the method of the invention can be applied to both materials 2 and 4, and the anchoring adhesive 11 selected for the material 2 may be different than the anchoring adhesive 11 selected for the material 4. In each case the anchoring adhesive 11 is selected for its superior adhesion to the specific material 2 or 4 to which it is being applied. As used herein, the term "adhesive" refers to any chemical agent, solution or composition capable of adhering two materials together, including without limitation urethanes, epoxies, resins, etc.

According to the method of the invention, the anchoring adhesive 11 is applied to the substrate to create an adhesion zone 10 comprising a plurality of adhesive anchors 12 spaced apart by interstitial spaces 14. The adhesive anchors 12 are preferably applied in a pattern to promote a uniform adhesion throughout the adhesion zone 10, as shown in FIG. 1, but may alternatively be disposed randomly about the adhesion zone 10.

Where flexibility is desired in the finished product and available flexible adhesives are not ideal for use as a bonding adhesive 15 because of poor adhesion to one or both materials 2, 4, a rigid anchoring adhesive 11 may be employed to create the adhesive anchors 12. The material 2 and/or 4 substantially retains its flexibility because the anchoring adhesive 11, although rigid when cured, is excluded from the interstitial spaces 14 between adhesive anchors 12.

In the preferred embodiment the anchoring adhesive 11 is applied as a fluid using a process similar to silk screening, for example using a conventional screen printing apparatus 20 as illustrated in FIG. 3, by which the anchoring adhesive 11 is applied to the substrate 2 or 4 through the openings in a mask or screen 22. The screen 22 is provided with adhesive-impervious portions 22*a* that will define the adhesive-free interstitial spaces between adhesive anchors 12 in the adhesion zone 10, and adhesive-pervious portions 22*b* through which the anchoring adhesive 11 passes to bond to the substrate 2 or 4 and form the adhesive anchors 12. The screen 22 is positioned over the substrate, and the anchoring adhesive 11 is applied to the substrate 2 or 4 through the openings 22*b* in the screen 22 to thereby form the plurality of isolated adhesive anchors 12. At the same time the adhesive-impervious portions 22*a*, which preferably form a grid-like pattern, define the interstitial spaces 14 by preventing the anchoring adhesive 11 from coming into contact with the substrate 2 or 4 between adjacent adhesive anchors 12.

A preferred embodiment of the method of the invention thus involves the following steps:

1. Positioning the substrate 2 or 4 on a work surface (not shown) with the adhesion zone 10 exposed.

2. Applying an anchoring adhesive 11 to the substrate, to form a plurality of substantially isolated adhesive anchors 12 separated by interstitial spaces 14.

3. After the anchoring adhesive 11 has gelled or cured, applying to the substrate 2 or 4, and/or to the other material 4 or 2, a bonding adhesive 15 having a relatively lower degree of adhesion (relative to the substrate 2 or 4) than the anchoring adhesive 11.

4. Adhering the substrate 2 or 4 to the other material 2 or 4 according to the requirements of the selected bonding adhesive 15 (e.g. applying pressure, heat etc. as required).

As noted above, in a preferred embodiment the adhesive anchors 12 are formed by positioning in contact with at least the adhesion zone 10, a mask or screen 22 having a plurality of adhesive-impervious portions 22a and adhesive-pervious portions 22b; applying the anchoring adhesive 11 through the adhesive-pervious portions 22b of the screen 22; and removing the screen 22 from the substrate 2 or 4. In this embodiment the anchoring adhesive 11 is typically applied under pressure, for example spread using a squeegee or the like (not shown). However, depending upon the viscosity of the anchoring adhesive 11, very little pressure may be required in order for the anchoring adhesive 11 to penetrate the pervious openings 22b in the screen 22.

The anchoring adhesive 11 thus forms a superior interface for the bonding adhesive 15, by providing improved chemical and physical bonding sites for the bonding adhesive 15. The shape of the adhesive anchors 12 also improves adherence of the bonding adhesive by increasing the effective adhesion surface area within the adhesion zone 10. Thus, even in cases where the bonding adhesive 15 adheres just as strongly to the substrate 2 or 4 as it does to the anchoring adhesive 11, the overall degree of adhesion is enhanced by the increased surface area in the adhesion zone 10 to which the bonding adhesive 15 can adhere.

In the case where a rigid anchoring adhesive 11 is applied to a flexible substrate 2 or 4, the product produced by the process so described retains the flexibility of the material 2 or 4, or both, because the cured anchoring adhesive 11 rigidifies only those small, isolated portions of the adhesion zone 10 to which the adhesive anchors 12 are directly bonded. The materials 2 and 4 are bonded together by the bonding adhesive 15, and the flexibility of the material 2 and/or 4 remains unimpeded along the interstitial spaces 14 between adhesive anchors 12. This allows a rigid anchoring adhesive 11 to be used without substantially detracting from the flexibility of the finished product, and thus eliminates a limitation which otherwise considerably restricts the types of adhesives available for adhering a flexible material to another material.

Further, the bonding adhesive 15 may be the same as the first or second material 2 or 4. For example in a casting resin system such as a printer roller, where an epoxy or urethane is cast onto a steel mandrel as substrate 2, the epoxy or urethane serves as both the second material 4 and the bonding adhesive 15. The principles of the invention, however, still apply.

Various embodiments of the present invention having been thus described in detail by way of example, it will be apparent to those skilled in the art that variations and modifications may be made without departing from the invention. The invention includes all such variations and modifications as fall within the scope of the appended claims.

We claim:

1. A method of adhering a first material to a second material, comprising the steps of:
    a. positioning the first material on a work surface, with an adhesion zone exposed;
    b. applying an anchoring adhesive to the first material or to the second material or to both, to form a plurality of substantially isolated adhesive anchors separated by interstitial spaces;
    c. after the adhesive anchors have cured to form a plurality of physical and chemical bonding sites within the adhesion zone, applying a bonding adhesive to the first material or to the second material or to both before the bonding adhesive has cured, the anchoring adhesive after curing of the anchoring adhesive having a relatively higher degree of adhesion to the first material or to the second material or to both than the degree of adhesion of the bonding adhesive to the first material or to the second material or to both after curing of the bonding adhesive;
    d. placing the second material into contact with the adhesive anchors and then curing the bonding adhesive to bond the bonding adhesive to the adhesive anchors; and
    e. removing the bonded first and second materials from the work surface,
        whereby the bonding adhesive intrudes into the interstitial spaces before curing and when cured bonds to the adhesive anchors.

2. The method of claim 1, in which the step of applying an anchoring adhesive to the first or second materials comprises the sub-steps of i. positioning a screen having a plurality of adhesive-impervious portions and adhesive-pervious portions in contact with at least the adhesion zone; ii. applying the anchoring adhesive through the adhesive-pervious portions of the screen; and iii. removing the screen.

3. The method of claim 2, in which the adhesive anchors are applied in a uniform pattern.

4. The method of claim 3, in which the screen provides a grid of adhesive-impervious portions.

5. The method of claim 1, in which the bonding adhesive is flexible.

6. The method of claim 1, in which the anchoring adhesive is rigid.

7. The method of claim 1, further comprising, before step c., the steps of
    i. positioning the second material on a work surface, with the adhesion zone exposed; and
    ii. applying the anchoring adhesive to the second material, to form a plurality of substantially isolated adhesive anchors separated by interstitial spaces.

8. A method of adhering a casting adhesive to a material, comprising the steps of:
    a. positioning the material on a work surface, with an adhesion zone exposed;
    b. applying an anchoring adhesive to the material, to form a plurality of substantially isolated adhesive anchors separated by interstitial spaces;
    c. after the adhesive anchors have cured to form a plurality of physical and chemical bonding sites within the adhesion zone, applying a casting adhesive to the material before the casting adhesive has cured, the anchoring adhesive after curing of the anchoring adhesive having a relatively higher degree of adhesion to the material than the degree of adhesion of the casting adhesive to the material after curing of the casting adhesive;
    d. allowing the casting adhesive to cure and bond to the adhesive anchors; and
    e. removing the bonded casting adhesive and material from the work surface,
        whereby the casting adhesive intrudes into the interstitial spaces before curing.

9. The method of claim 8, in which the step of applying an anchoring adhesive to the material comprises the sub-steps of i. positioning a screen having a plurality of adhesive-impervious portions and adhesive-pervious portions in contact with at least the adhesion zone; ii. applying the anchoring adhesive through the adhesive-pervious portions of the screen; and iii. removing the screen.

10. The method of claim 9, in which the adhesive anchors are applied in a uniform pattern.

11. The method of claim 10, in which the screen provides a grid of adhesive-impervious portions.

* * * * *